United States Patent
Fang et al.

(10) Patent No.: US 9,622,189 B2
(45) Date of Patent: Apr. 11, 2017

(54) TECHNIQUES FOR FAST DELIVERY OF RADIO INFORMATION

(71) Applicant: ZTE Corporation, Shenzhen (CN)

(72) Inventors: Yonggang Fang, San Diego, CA (US); Bo Sun, Shenzhen (CN); Anming Jiang, Shenzhen (CN); Nan Li, Shenzhen (CN); Kaiying Lv, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 71 days.

(21) Appl. No.: 14/670,389

(22) Filed: Mar. 26, 2015

(65) Prior Publication Data

US 2015/0282043 A1    Oct. 1, 2015

(51) Int. Cl.
*H04W 52/24* (2009.01)
*H04W 72/08* (2009.01)
*H04W 40/16* (2009.01)

(52) U.S. Cl.
CPC ....... *H04W 52/241* (2013.01); *H04W 52/243* (2013.01); *H04W 72/085* (2013.01); *H04W 40/16* (2013.01)

(58) Field of Classification Search
CPC .......................... H04W 52/243; H04W 72/085
USPC .......................................................... 370/329
See application file for complete search history.

(56) References Cited

U.S. PATENT DOCUMENTS

| | | | |
|---|---|---|---|
| 2007/0091813 A1* | 4/2007 | Richard | H04W 72/085 370/248 |
| 2013/0051335 A1* | 2/2013 | Adachi | H04W 74/0808 370/329 |
| 2014/0086081 A1* | 3/2014 | Mack | H04L 5/006 370/252 |

* cited by examiner

*Primary Examiner* — Mohammad Anwar
*Assistant Examiner* — Kokou R Detse
(74) *Attorney, Agent, or Firm* — Perkins Coie LLP (57) ABSTRACT

A transmitting wireless device provides channel access information to a receiving wireless device for the receiving wireless device to make a determination of when to transmit and what transmissions parameters to use for the transmission. The channel access information may be used differently by wireless devices operating in a basic service set and an overlapping basic service set. Channel access information may include fields indicative of transmission power used, signal to noise ratio headroom available, and so on. Channel access information may be generated and transmitted at the PHY layer of an implementation, thus providing a fast delivery to the receiving wireless device.

15 Claims, 8 Drawing Sheets

Path loss and SINR header room calculation

FIG. 1 an example of infrastructure BSS

FIG. 2 OBSS deployment

FIG. 3 An example of HE-SIG of HEW PHY frame

FIG. 4 Path loss and SINR header room calculation

FIG. 5 An example of setting HE-SIG by HEW STA

FIG. 6 An example of CCA procedure of HEW station

TECHNIQUES FOR FAST DELIVERY OF RADIO INFORMATION

CROSS REFERENCE TO RELATED APPLICATIONS

This patent document claims the benefit of priority under 35 U.S.C. §119(a) and the Paris Convention of International Patent Application No. PCT/CN2014/074331, filed on Mar. 28, 2014. The entire content of the before-mentioned patent application is incorporated by reference herein.

BACKGROUND

This patent document relates to wireless communications.

Wireless communication systems can include a network of one or more access points (AP) to communicate with one or more wireless stations (STA). An access point can emit radio signals that carry management information, control information or users' data to one or more wireless stations, and a station can also transmit radio signals to the access point in the same frequency channel via time division duplexing (TDD) or in a different frequency channel via frequency division duplexing (FDD).

IEEE 802.11 is an asynchronous time division duplexing technology designated for wireless local area network (WLAN). The basic unit of WLAN is a basic service set (BSS). The infrastructure BSS is the BSS with stations through associating with an Access Point (AP) to connect to the wired network or Internet. In a BSS, both access point and stations share the same frequency channel via using Carrier Sensing Multiple Access with Collision Avoidance (CSMA/CA) technology, a kind of TDD mechanism, for multiple access and data transmission.

SUMMARY

This patent document describes technologies for, among other things, a fast delivery mechanism of radio information for Clear Channel Assessment (CCA), optimizing transmit power and Modulation and Coding Scheme (MCS) adaptation to radio environment condition such that a High Efficiency Wireless (HEW) station could assess more accurately the channel occupancy and determine whether or not starting a new transmission, thereby mitigating interference to existing transmission(s).

In one example aspect, a method of wireless communication is disclosed. The method includes performing, by a wireless communication device, interference measurement of a wireless transmission medium, and performing a current wireless transmission that includes channel assessment information. The channel assessment information includes one or more of: (a) a transmit power used for the current wireless transmission; and (b) a header room of Signal to Interference and Noise Ratio (SINR) left in the current wireless transmission according to the interference measurement.

In another example aspect, an apparatus for wireless communication is disclosed. The apparatus includes a memory that stores executable instructions, and a processor that reads the executable instructions from the memory to control one or more modules of the wireless communication apparatus to perform interference measurement of a wireless transmission medium, and perform a current wireless transmission that includes channel assessment information. The information includes one or both of (a) a transmit power used for the current wireless transmission, and (b) a header room of Signal to Interference and Noise Ratio (SINR) left in the current wireless transmission according the interference measurement. Various examples are given with respect to Eq. (1) to Eq. (5).

In yet another example aspect, a method of wireless communication is disclosed. The method includes sensing, prior to performing a transmission, a medium for received signal strength, performing, if the sensed received signal strength is below a threshold, the transmission, receiving, if the sensed received signal strength is above the threshold, a PHY transmission, attempting to decode the PHY transmission, extracting, when the attempt to decode the PHY transmission is successful, channel assessment information from the PHY transmission, and adjusting, based on the channel assessment information, a value of the threshold for future use.

Details of the above aspects and their implementations are set forth in the accompanying drawings, the description and the claims.

DETAILED DESCRIPTION

This document describes techniques, mechanisms, devices, and systems for fast delivery mechanism of radio information for CCA threshold adjustment, transmit power optimization, and MCS rate adaptation to channel condition in a Basic Service Set (BSS) and an overlapping BSS (OBSS) in contention based wireless communications.

In one aspect, a fast delivery method is provided for stations to include the transmit power information used for the current transmission in the HE-SIG of HEW PHY frame. This transmit power information could be used by other HEW stations to calculate the path loss and determine the interference level.

In another aspect, a method is provided for station to include SINR header room information in HE-SIG of HEW PHY frame. This SINR header room information could be used by other HEW stations to adjust CCA threshold to provide dynamic CCA setting.

In yet another aspect, a method is provided for stations to optimize the transmit power of new HEW transmission. In some embodiments, through optimization of transmit power, the new transmission would not severely interfere existing transmission(s).

In yet another aspect, a method is provided for stations to choose appropriated MCS rate adaptive the receiving channel condition of HEW AP. In some embodiments, through MCS adaptation, the new transmission over the same channel shared with other existing transmissions could be successfully demodulated and decoded by the HEW AP in BSS.

In another aspect, a method is provided for stations to include the color code in HE-SIG of HEW PHY frame. The color code in HE-SIG could be used for HEW stations to distinguish a received frame from its BSS or OBSS without decoding MAC header. In some embodiments, it allows HEW station to get the information of received frame quickly to assist the preparation for the new HEW transmission.

In yet another aspect, a method is provided for AP to include the information of "new transmission allowed" (NTA) in HE-SIG of HEW PHY frame. The information of NTA could be used by HEW stations to determine whether multi-user MIMO or spatial diversity transmission is allowed in the BSS.

In yet another aspect, a method is provided for stations to assess the channel occupancy via the maximum accepted MCS rate. In some embodiments, combining optimized transmission power and new channel assessment algorithm would allow to reduce the interference to existing transmissions over the same channel and improve the channel usage efficiency.

Section headings are used in the present document only for lucidity, and do not in any way limit the scope of the disclosed technology.

In IEEE 802.11, the basic service set (BSS) is the building block of a Wireless Local Area Network (WLAN). Wireless stations (also called stations) associated in the radio coverage area establish a BSS and provide basic service of WLAN.

Figure 1:
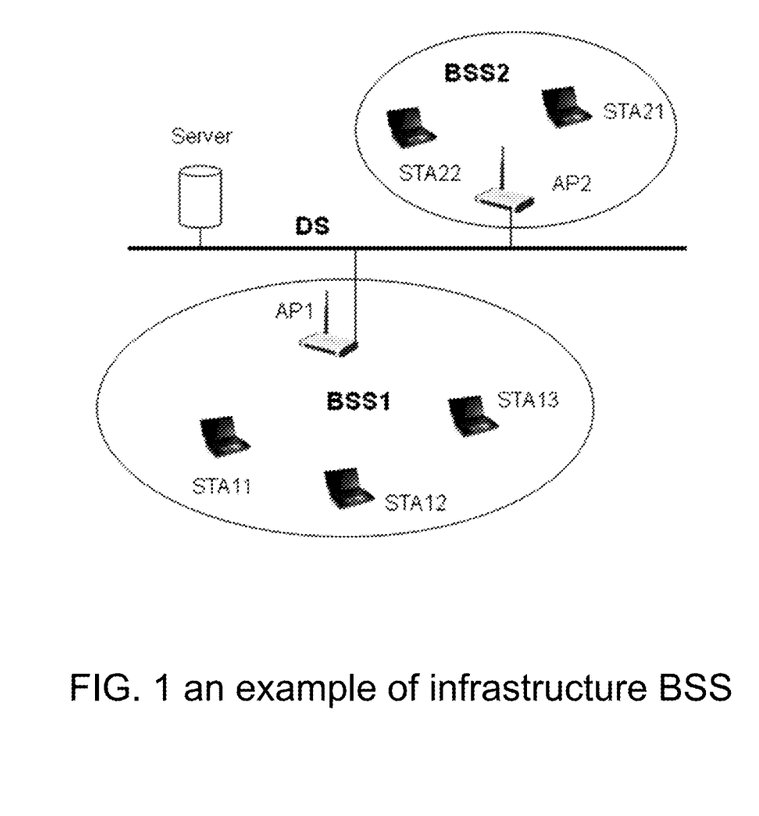
FIG. 1 shows an example of infrastructure BSS in a wireless communication system.

FIG. 1 illustrates an example of infrastructure BSS. BSS1 and BSS2 are infrastructure BSSes. BSS1 contains one access point (AP1) and several non-AP stations, STA11, STA12, and STA13. The AP1 maintains associations with stations STA11, STA12, and STA13. BSS2 contains one access point (AP2) and two non-AP stations, STA21 and STA22. The AP2 maintains associations with stations STA21 and STA22. Infrastructure BSS1 and BSS2 may be interconnected via the AP1 and AP2 or connected to a server through a distribution system (DS). A central station being associated with other stations and dedicated to manage the BSS is referred to an Access Point (AP). A BSS built around an AP is called an infrastructure BSS.

IEEE 802.11 wireless communications support multiple access and provide two types of access control mechanisms for multiple stations to access the medium:
A) Distributed Coordination Function (DCF)
B) Point Coordination Function (PCF).

PCF (or its enhanced version HCCA—hybrid control function coordinated channel access) is a centrally controlled multiple Media Access Control (MAC) mechanism used in IEEE 802.11 based WLANs. PCF typically resides in an AP to coordinate the communication within the BSS. The AP waits for PIFS (PCF interframe space) to contend the medium after the medium is sensed in idle. With higher priority than DCF, AP can contend the medium earlier than other stations and send a CF-Poll frame to the PCF capable stations to schedule its transmissions. If the polled station does not have any frames to send, it transmits null frame to the AP. Otherwise, the polled station will take the transmission opportunity to send its data frames to the AP over the medium.

Since PCF (or HCCA) uses polling mechanism for multiple access control, i.e. it alternatively in time polls all the associated stations to check whether they have data to send, it may encounter channel efficiency issue when there are a large number of associated stations in the deployment cases such as the hotspot of public area or conference room. When the number of associated stations is large, but only a few of them are active (i.e. stations that want to send packets to the network), the PCF polling mechanism is not very efficiency and causes a lot of medium waste.

DCF, on the other hand, relies on the carrier sensing multiple access with collision avoidance (CSMA/CA) mechanism to control the multiple medium accesses. Each station implements a CSMA/CA function. Before access to the wireless medium, the station senses the medium occupancy using CSMA/CA. If the station senses that the medium is busy, the station waits and retries sensing the medium at a later time. If the station senses the medium in idle state, it will wait for some IFS and then enter a time period called the contention window (CW). In order to support multiple stations to access the medium, each station has to backoff a random time before transmitting over the medium so that the access to medium could be evenly distributed.

Clear Channel Assessment (CCA) is a function of PHY that is used to determine the current state of the wireless medium occupancy. CCA mechanism could be categorized as:

A) CCA-Carrier Sensing (CCA-CS)

The CCA-CS can be performed by the PHY of station via measuring the signal strength of preamble (short training sequence) of an OFDM transmission at a receiving level equal to or greater than the minimum modulation and coding rate sensitivity, called CCA Threshold (CCAT). In some embodiments, the CCAT may be set to:

CCAT=−82 dBm for 20 MHz channel bandwidth, or
CCAT=−79 dBm for 40 MHz channel bandwidth, etc.

A CCA mechanism of a station may report busy when a preamble is detected at or above the CCAT. A CCA mechanism may consider the medium to be busy for the length (duration) of the received frame as indicated in the frame's PLCP Length field.

B) CCA-Energy Detect (CCA-ED)

If the PHY of station is not able to detect preamble of a valid OFDM transmission, the PHY may perform CCA ED, and claim a medium busy condition when CCA-ED measures the signal strength at level to or greater than, e.g., 20 dB high over the minimum modulation and coding rate sensitivity CCAT (in dBm). CCA-ED could be used for detection on medium sharing with inter-technology (i.e., different MAC-PHY occupying the same spectrum) system.

CCA mechanism is originally designated for single transmission detection. In some embodiments, once CCA senses the RSSI (received signal strength indication) of received signal higher than CCAT, the medium is assessed as busy, and the station has to wait until the medium becomes idle, and then can transmit a frame. In a Multi-User Multiple Input and Multiple Output (MU MIMO) and spatial reuse system, multiple transmissions could be allowed in the medium sharing especially in OBSS cases. Therefore different and dynamic CCA threshold level might be used to determine the channel availability in different situations.

A CCA sensing station may distinguish the case that the detected signal is sent from its BSS or from OBSS so that it could determine which CCA threshold adjustment would be used.

Figure 2:
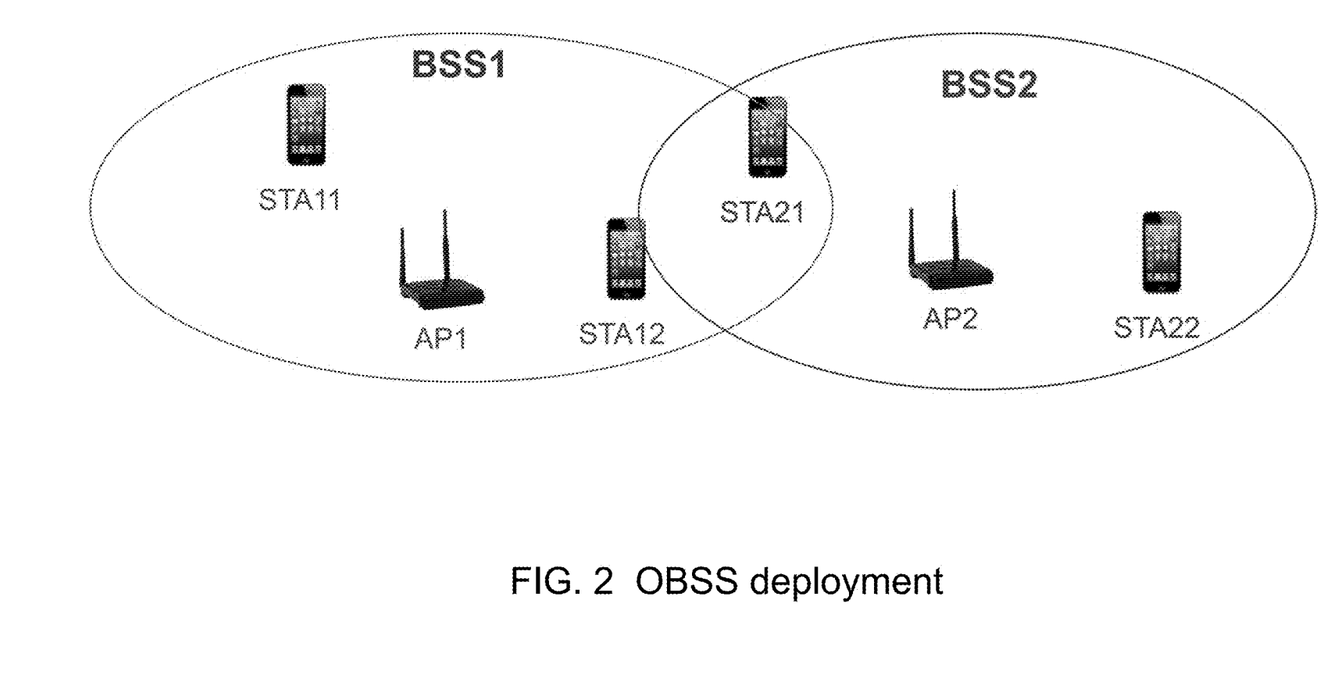
FIG. 2 shows an example of OBB deployment scenario in IEEE 802.11.

FIG. 2 shows an example of two BSSs that are overlapped each other.

AP1, STA11 and STA12 belong to BSS1. AP2, STA21 and STA22 belong to BSS2. In the overlapped area of BSS1 and BSS2, STA12 and STA21 can hear the transmissions from both AP1 and AP2. The PHYs of STA11 and STA21 need to distinguish the received signals from BSS1 or BSS2. For example, if STA21 detects the signal transmitted from BSS2 and knows that AP2 does not support MU MIMO transmission simultaneously, STA21 should not start a new transmission to AP2. However, if the transmission detected by STA21 is from BSS1 and the measurement of RSSI from received frames is very low, STA21 may consider starting a new transmission to AP2 since the new transmission may not severely interfere the existing transmission in BSS1.

According the 802.11 specification, a CCA sensing station should measure the channel condition at its receiver. Based on the channel measurement, the CCA sensing station should estimate the radio condition of its peer station that it is going to transmit to, and then should determine the MCS rate to be used for the new transmission based on the estimation result. Sometimes in operation, the estimation may not be very accurate since the interference at those two stations (the transmitting station and the receiving station) may be very different and the radio condition could change significantly in the time difference between when a decision is made and when the actual transmission is performed.

If the channel condition of its peer station is estimated to be too optimistic, the CCA sensing station may choose a higher MCS rate for the frame to be transmitted, which may cause its peer station not be able to decode the frame successfully. On the other hand, if the channel condition of its peer station is estimated too conservative, then the CCA sensing station may choose a lower MCS rate for the frame to be transmitted. Although the transmitted frame could be decoded successfully by the peer station, it would not use the medium efficiently. Therefore it would be helpful to develop the fast delivery mechanism about radio information to assist the CCA sensing station to choose appropriate MCS rate which is adaptive to the radio condition of the receiving station.

When a station measures RSSI, the measured RSSI of received signal could be from its BSS or OBSS. To take into account the differences in how spectrum gets utilized in BSS and OBSS, a sensing station could change the existing CCA mechanism by:

A) evaluating whether or not its new transmission could severely interfere the existing transmissions in OBSS and/or BSS.

B) evaluating whether its new transmission could be received by its peer station in BSS.

To help with these evaluations, a new high efficiency WLAN (HEW) station could deliver one or more of the following information: the transmit power used for current transmission and/or header room of SINR left for the new transmission according to its current interference measurement. With such information, receiving HEW stations would be able to assess channel condition accurately and determine whether or not it could be able to start a new transmission in the shared environment without severe inference to existing transmissions. Due to the channel variance and interference change frequently, the fast delivery mechanism, e.g., delivery generated at the PHY layer thereby avoiding processing delays through the MAC layer, about radio channel condition is required for HEW stations to catch such changes.

In some embodiments, a new mechanism, called the fast delivery of radio information for CCA and MCS adaptation, can be used to, among other things, allow the HEW station to fast adjust its CCA threshold, the transmit power and/or appropriate MCS rate used for the new transmission adaptive to the radio environment of BSS and OBSS. A station with adaptive CCA, TPC and/or MCS capability is called the HEW station. The mechanism of fast delivery of radio information for CCA, TPC and/or MCS adaptation could use one or both of two approaches:

1) Approach-1: in this approach, it is assumed that the HEW station will use its full power to transmit a new PPDU (physical layer protocol data unit). Before its transmission, the HEW station may determine the adjustment of CCA threshold (CCAT), assess the channel occupancy and calculate the appropriate MCS rate which is adaptive to the receiving condition of its peer HEW station (AP) for successful demodulation and decoding.

2) Approach-2: in this approach, an HEW station optimizes its transmit power in a new PPDU transmission. Before its transmission, the HEW station may determine the optimized transmission power level that does not cause severe interference to the existing transmissions, and calculate the appropriate MCS rate which is adaptive to the receiving condition of its peer HEW station (AP) for successful demodulation and decoding.

Figure 3:
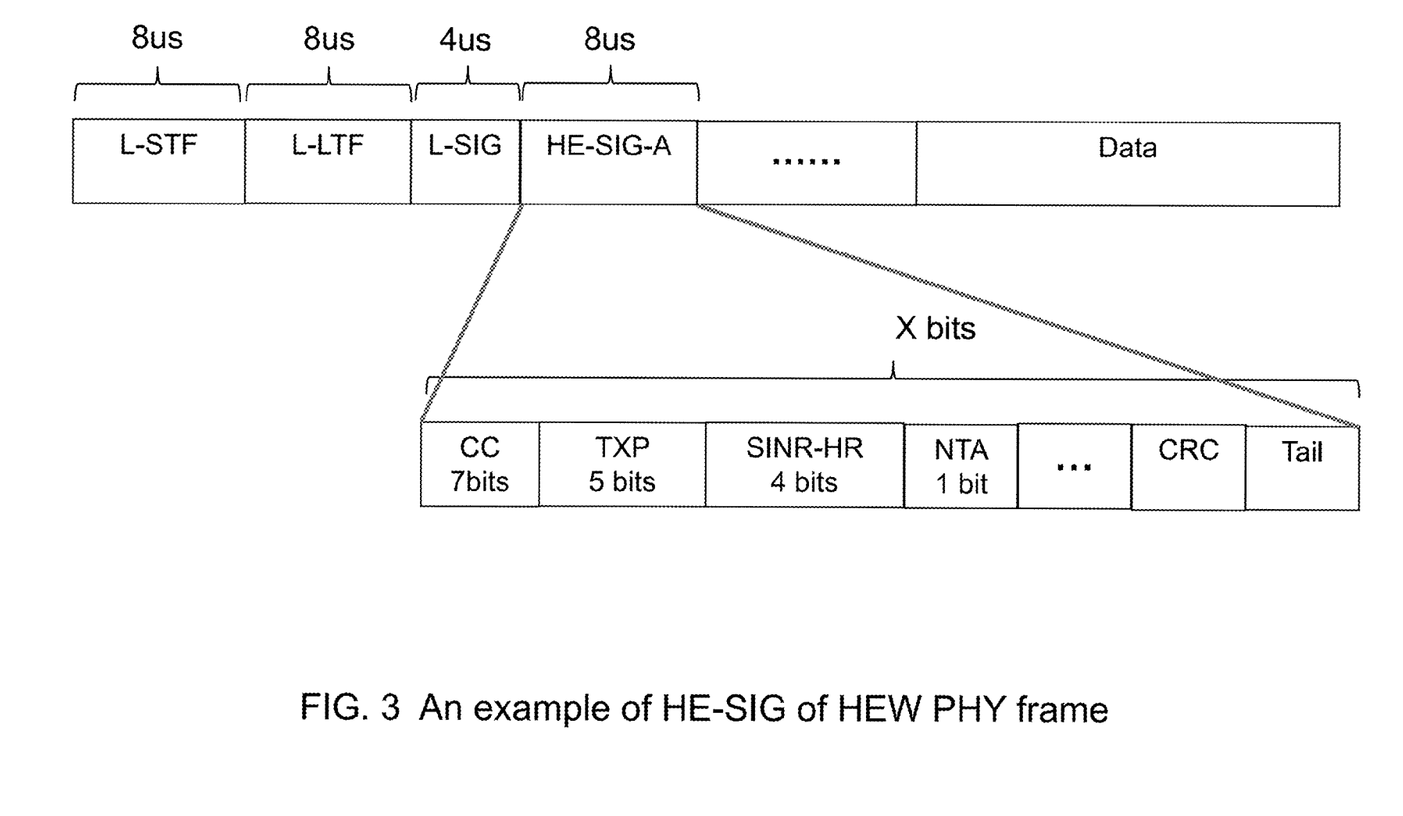
FIG. 3 shows an example of invented HE-SIG in HEW PHY frame.

FIG. 3 shows an example of a PHY layer signal (SIG) of a HEW station that supports fast delivery mechanism of radio information for CCA, TPC and/or MCS adaptation.

The SIG in PHY of HEW station, called HE-SIG, may contain the following fields:

Color Code (CC) of BSS: The CC information can be used by the receiving HEW station to determine whether the received signal belongs to its BSS or OBSS. A HEW station sets this field according to its associated BSS color code information. For example, the HEW AP could set its CC=1xxxxxx, while other HEW STAs in the BSS sets its CC=0xxxxxx, where xxxxxx is the CC of BSS (which could be a unique identifier for the BSS in the coverage area, and could be re-used in ESS).

TX Power (TXP): The TXP is provided for the other HEW station to estimate the path loss of transmission when receiving the frame. The HEW station sets the TXP field to the transmit power to be used for the current transmission, i.e., the transmission in which the TXP field is carried. If a station always uses full power for its transmission, TXP might not be necessary to include the HE-SIG.

SINR Header Room (SINR-HR): The SINR header room is the estimation of SINR of signal over the interference level, which may be used by the receiving HEW station to determine the MCS rate for new transmission and set its optimized transmit power. The HEW station could set this field to the SINR header room left for possible new simultaneous transmission. The SINR-HR field may be interpreted as follows. In the absence of the SINR-HR information, when a receiving station receives a transmission at MCS N, then the receiving station may conclude that an MCS rate M is to be used for its subsequent transmission. When the SINR-HR includes a value, then the receiver station may instead select an MCS rate M1 that is greater than the MCS rate M, because the receiver station can interpret that the channel quality is better than indicated by the use of MCS rate N. For example, in some embodiments, greater the value in the SINR-HR field, greater the difference between MCS rates M1 and M.

New Transmission Allowed (NTA): The HEW AP can set this field to "1" if it will allow a new transmission simultaneously with existing transmission(s). Otherwise, this field is set to "0". A HEW STA can check this field associated to its BSS before starting a new transmission, and can ignore the NTA if it is sent from OBSS.

Figure 4:
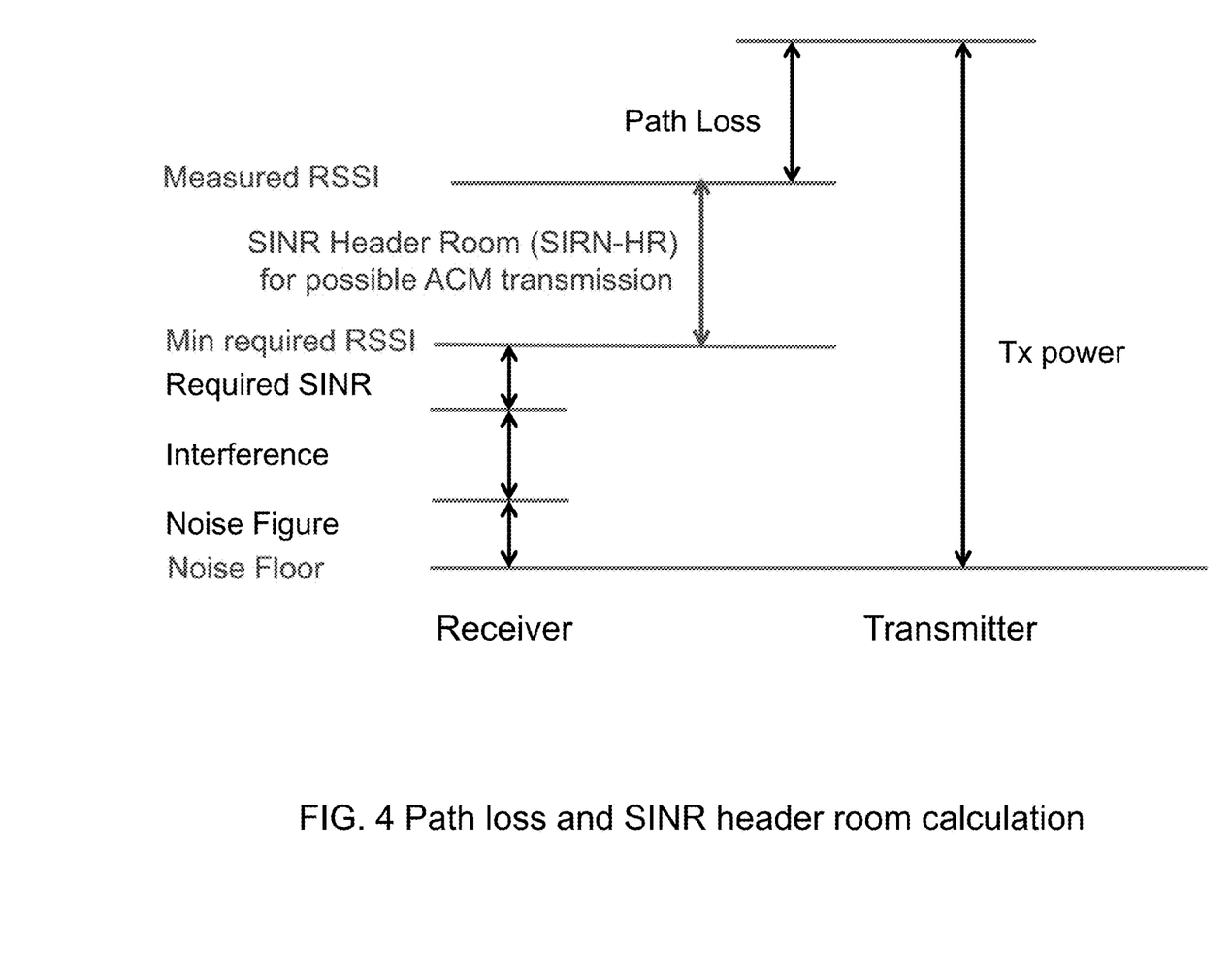
FIG. 4 shows an example of relationship of radio parameters.

FIG. 4 shows an example of relationship among different radio parameters related to calculation of CCA, transmission path loss, optimized transmit power, and SINR header room for a possible new HEW transmission.

In some embodiments, a HEW station (transmitter) sends a frame with TX power (TXP). After propagation, the transmitting frame is measured by the HEW station (receiver) as "measured RSSI". Based on the measurement of interference and noise at the receiving HEW station, the HEW station could derive the SINR header room (SINR-HR) left a new HEW transmission. The HEW station could include SINR-HR information in PHY HE-SIG of frame. This SINR-HR information could be used by another HEW station to determine the CCA threshold adjustment, optimize the transmit power and/or adapt MCS rate for a new HEW transmission over the existing transmission in the shared manner.

Figure 5:
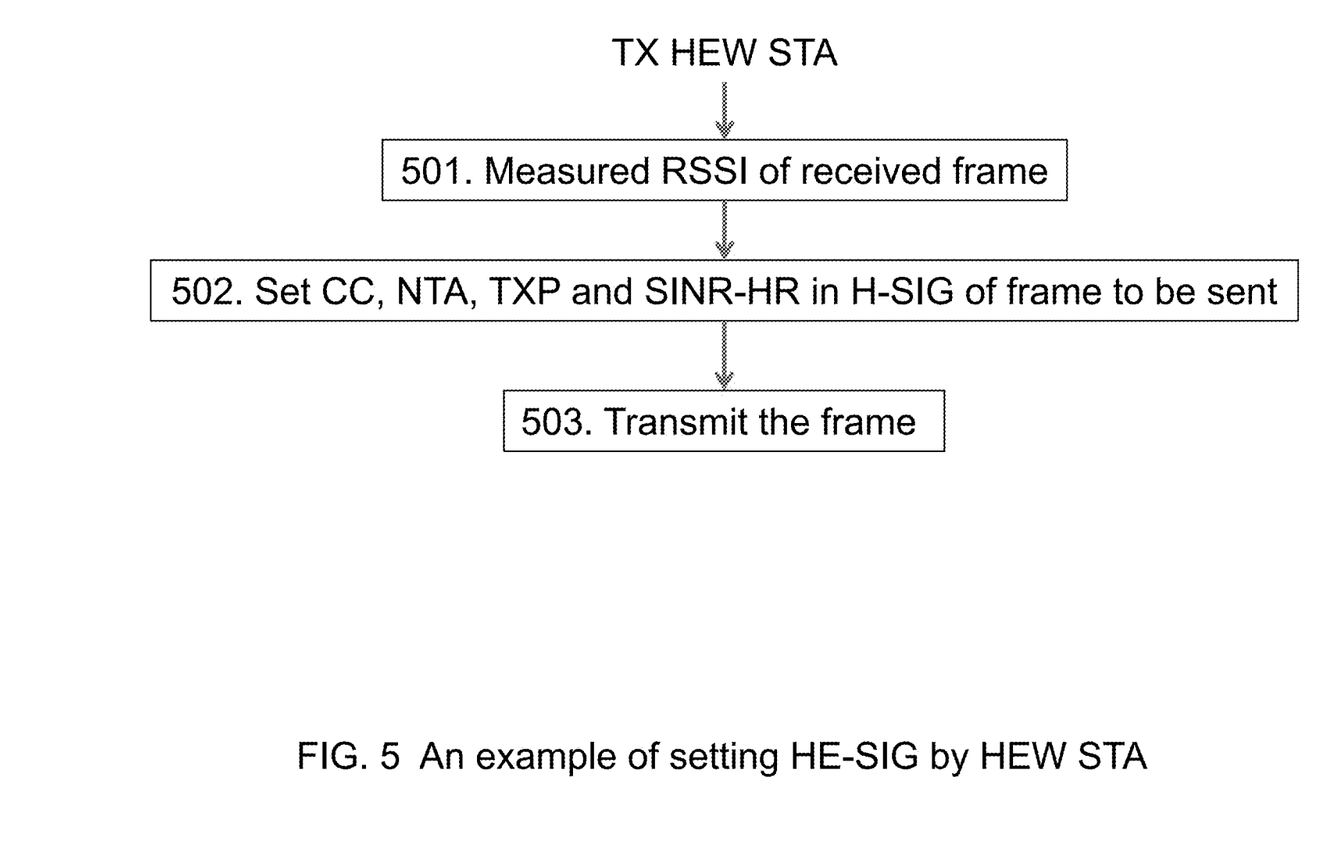
FIG. 5 shows an example of setting HE-SIG by HEW station.

FIG. 5 shows an example of procedure that a HEW station can use to set the HE-SIG field of HEW PHY frame.

501. A HEW STA measures the RSSI of received frame sent from either BSS or OBSS.

502. The HEW STA includes HE-SIG in PHY header of every transmitting HEW frame. The HEW station may set one or more of the following parameters in HE-SIG as follows.

A) Color Code. A HEW AP may set its CC=1xxxxxx, while other HEW STA in BSS STA sets CC=0xxxxxx, where xxxxxx is the CC of the BSS.

B) TXP. The HEW station may set this field to the transmit power to be used for the current transmission. If the station always uses full power for transmission, it may not need to include TXP in HE-SIG.

C) SINR-HR. The HEW station may set this field to the SINR header room which is from the measured RSSI to the minimum required RSSI for that MCS rate.

If the HEW STA is receiving frames from my BSS:

$$\text{SINR-HR} = \text{measured RSSI} - \text{minimum RSSI for that MCS} \qquad \text{Eq. (1)}$$

where "minimum RSSI" may be a value that is decided a priori for a given deployment or a given cellular network. If the HEW STA is receiving frames from OBSS:

$$\text{SINR-HR} = \text{measured RSSI} + 82 \text{ dBm} + \text{Delta} \qquad \text{Eq. (2)}$$

The number "delta" may be a value that reflects an implementation budget (e.g., degradation through actual hardware implementation) of a particular receiver. Alternatively, Delta may be a system-wide constant that is known a priori to all stations in the system.

D) NTA: The HEW AP sets NTA field to "1" if it allows a new transmission simultaneously over the same channel shared with existing transmission(s) in BSS. Otherwise, this field is set to "0".

The minimum SINR (in dB) for different MCS rate could be pre-defined at different Packet Error Rate (PER). The minimum required SINR could be used for calculating SINR header room, the maximum accepted MCS and CCAT according to the path loss.

503. The HEW station transmits a HEW frame. The HEW frame may include some or all of the above-described parameters.

Figure 6:
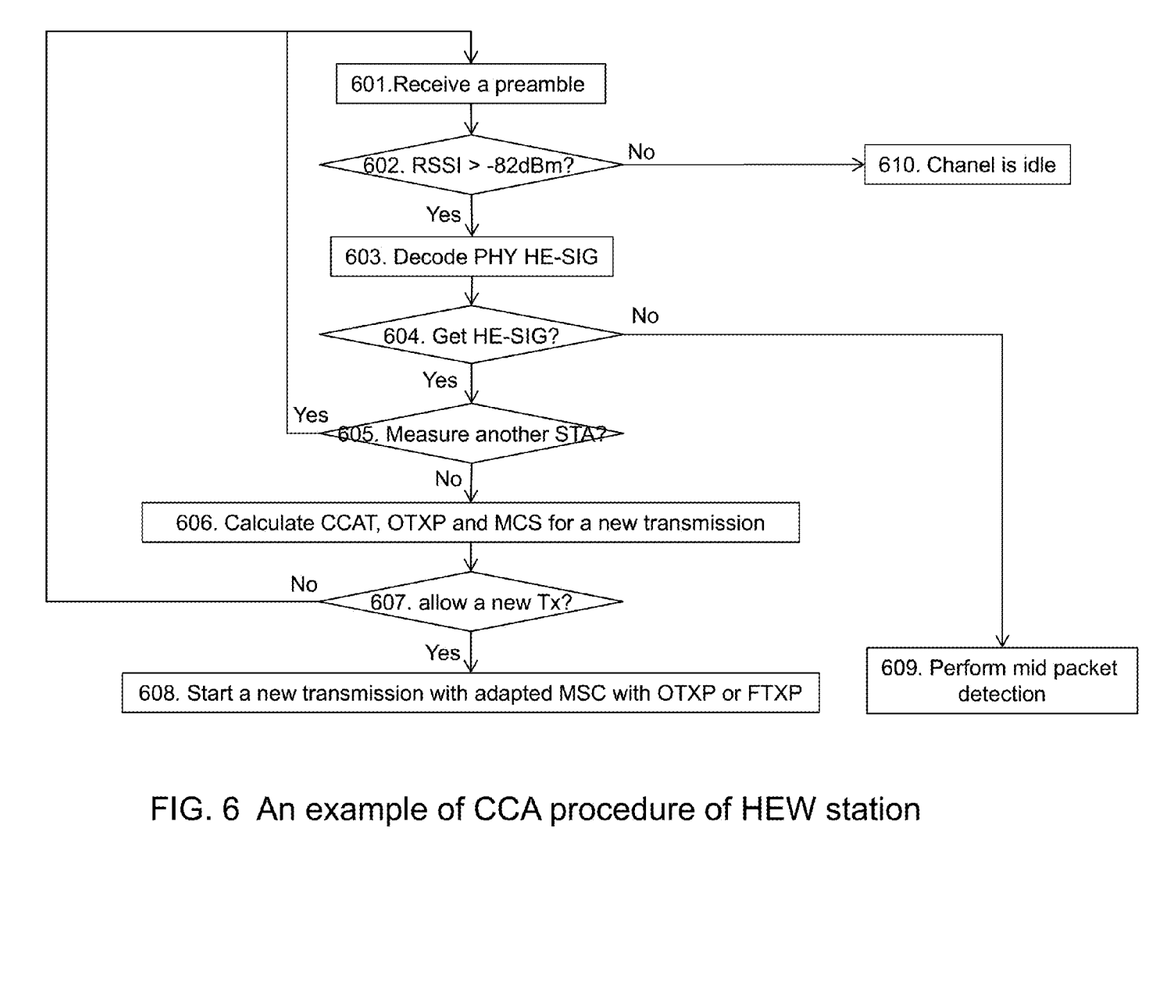
FIG. 6 shows an example of CCA procedure of HEW station.

FIG. 6 shows an example of procedure of HEW station sensing the channel and determining whether to perform a new transmission.

601. A HEW station starts channel sensing after it receives a preamble of transmission from other station in either its BSS or OBSS.

602. If the HEW station detects the preamble within a predetermined threshold, e.g., with RSSI<=−82 dBm, then the HEW station assesses the medium as idle and may start a new transmission.

603. Otherwise, if the HEW station detects the preamble of frame outside of the threshold, e.g., with RSSI>−82 dBm, it decodes PHY fields including HE-SIG field to further assess the channel occupancy condition.

604. If the HEW station can verify that the field following the preamble belongs to a legacy frame, it shall follow the existing procedure to process the received legacy frame. If the HEW station has recognized the field not for legacy frame, but could not verify it as the HE-SIG field, it means HE-SIG field might be corrupted, then the HEW station may switch to perform the mid packet detection to further determine channel occupancy.

605. Otherwise, if the HEW station can decode the HE-SIG field correctly, it needs to store the HE-SIG information for that station, and decide whether or not sensing another HEW station. If the HEW station finds the received frame is from its BSS based on the color code in the HE-SIG, it needs to further check whether the frame is addressed to itself. If the frame is addressed to itself, it shall follow the normal procedure to decode and process the received frame. Otherwise, the HEW station may need to further determine whether it can start a new transmission over the existing one.

606. If the HEW station completes the sensing the channel via detecting preamble of frames sent from other stations, the HEW station can calculate CCA threshold (CCAT), optimized transmit power (OTXP) to be used for a new transmission without not severely interfering existing transmissions, and/or appropriate MCS rate for the new transmission that could be received by its peer HEW station successfully.

607. If HE-SIG of the received frame indicates that CC is my BSS and a new transmission is not allowed, then the HEW station shall set its NAV (Network Allocation Vector) and go back to the beginning to sense the channel again until the medium is permitted to transmit.

608. Otherwise, i.e. the existing transmission is either from OBSS or from my BSS but the new transmission is allowed, the HEW station can start a new HEW transmission with adaptive MCS rate using the optimized transmit power or full transmit power. The new HEW transmission could means sending a frame over the same channel shared with other transmissions, i.e. it could be multi-user MIMO, or spatial diversity transmission.

The algorithms for CCA threshold adjustment, transmit power optimization, MCS rate adaptation and the channel occupancy assessment are provided as follows in detail.

CCA Threshold (CCAT) Adjustment for Channel Occupancy Assessment.

The CCAT adjustment is used in the approach-1 for dynamic adjustment of CCA threshold. Approach-1 assumes the HEW station always uses its full power to transmit a frame and calculate CCAT for the new transmission over the same channel but not severe interference to the existing transmission.

In Approach-1, an HEW station assumes:

SINR-HR (STA-m) is the SINR header room received in the HE-SIG of frame from "STA-m" in either BSS or OBSS.

PathLoss(STA-m) is the path loss from the HEW STA to HEW "STA-m"

then

The adjustment of CCA threshold (CCAT) calculated by the HEW STA is:

CCAT=min(−82 dBm+full TX power of HEW STA− PathLoss(STA-*m*)−SINR-HR(STA-*m*))+Delta-A; for all "*m*".

Optimized Tx Power (OTXP) for New Transmission

The OTXP is used in the Approach-2 for the HEW station to optimize the transmit power to be used for the new transmission over the same channel shared with existing transmission, and not severely interfere the existing transmission. A HEW STA gets the path loss of the signal from HEW "STA-m" either in the BSS or OBSS.

Path Loss(STA-*m*)=TXP(STA-*m*)−measured RSSI (STA-*m*)   Eq. (3)

The HEW STA then calculates the allowed transmit power that does not impact the current transmission on "STA-m."

Allowed Tx Power(STA-*m*)=Path Loss(STA-*m*)+ SINR-HR(STA-*m*)+Delta-B   Eq. (4)

The HEW STA should calculate the allowed Tx Power (STA-m) for all "m", and find the optimized TX power (OTXP) for a new transmission.

OTXP=min(allowed Tx Power(STA-*m*)); for all "*m*"   Eq. (5)

MCS Rate Adaptation for New Transmission:

The algorithm of MCS rate adaptation for new transmission could be used in either Approach-1 or Approach-2 of fast delivery mechanism.

For Approach-1: the maximum accepted MCS rate (MCSmax) used for a possible new transmission to the AP in BSS can be calculated as:

SINR for MCSmax<SINR-HR(AP in BSS)   Eq. (6)

For example, if the SINR header room of the AP in BSS is about 13 dB, then the possible new transmission may use 16QAM ½ rate. As another example, if the SINR header room of the AP in BSS is only 3 dB left, then there might be no MCS rate suitable to be used for new transmission.

For Approach-2: the max accepted MCS rate (MCSmax) for a possible new transmission is that its required SINR for MCSmax may meet:

SINR for MCSmax<OTXP−PathLoss(AP)   Eq. (7)

where:

OTXP is the optimized transmit power to be used for the possible new transmission.

PathLoss (AP) is the path loss calculated from HEW AP to the HEW station.

Example of Determination of a Possible New Transmission

In order to determine a possible HEW transmission, a HEW STA may first check the NTA of HE-SIG whether the HEW AP of its BSS allows new transmission. If not, the HEW station may not start a new transmission.

For example, if the HEW AP can support single UL transmission and it does not communicating with other station currently, the HEW AP should set the "new transmission allowed"="1", which permits a HEW station to start an new transmission.

If the HEW AP supports the adjustment of CCAT and/or optimized transmit power mechanism, but only allows single UL transmission. Then the HEWAP can block an new transmission via setting NTA="0" in HE-SIG even its SINR header room could be able to support new HEW transmission when the HEW AP is communicating with another HEW station.

If the HEW AP can support multiple simultaneous UL transmissions, and there is one baseband module available for a new transmission, the HEW AP can set the NTA in HE-SIG="1".

If the possible new transmission is allowed, the HEW station further checks:

For Approach-1, if the HEW station measures RSSI>CCAT, the medium is assessed as busy. No new transmission is permitted. Otherwise, the medium is assessed as idle and may allow to start a new transmission.

For Approach-2, since the transmit power for new transmission is adjustable to the level adaptive to the medium condition, the current CCA criteria may not be feasible for the channel occupancy assessment. The new assessment would be:

If the maximum accepted MCS rate is higher than BPSK ½, a new HEW transmission at the optimized transmit power would be allowed. Otherwise, the medium shall be assessed as busy, and no new transmission is permitted.

Figure 7A:
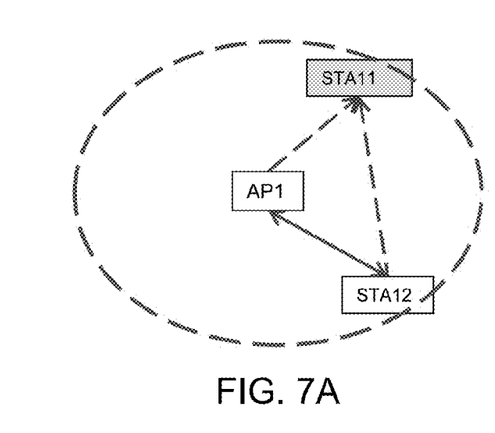
FIGS. 7A-7B show examples of HEW station detecting transmission in BSS.
Figure 7B:
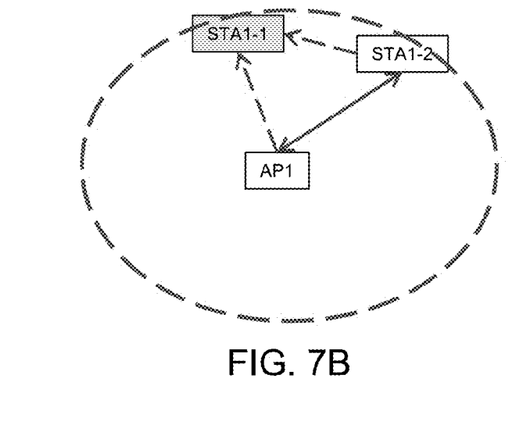

FIG. 7 shows example of HEW stations' detecting transmission in BSS.

In FIG. 7A, it assumes the HEW AP1 allows new transmission in NTA of HE-SIG, and the HEW AP1 and STA12 have enough SINR header room for a new transmission. In this scenario, the HEW STA11 may start a new transmission to HEW AP1.

In FIG. 7B, it assumes the HEW AP1 allows new transmission in NTA of HE-SIG, but the HEW STA11 detects RSSI of received signal from HEW STA12 is higher than the CCAT. In this scenario, the HEW STA11 may not start a new transmission to HEW AP1.

Figure 8A:
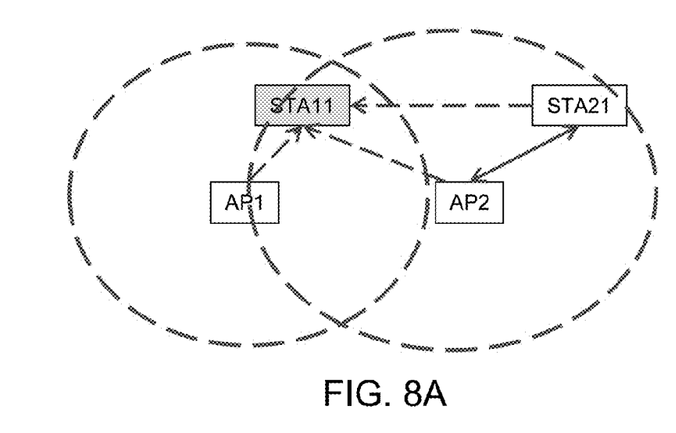
FIGS. 8A-8B show examples of HEW station detecting transmission in OBSS.
Figure 8B:
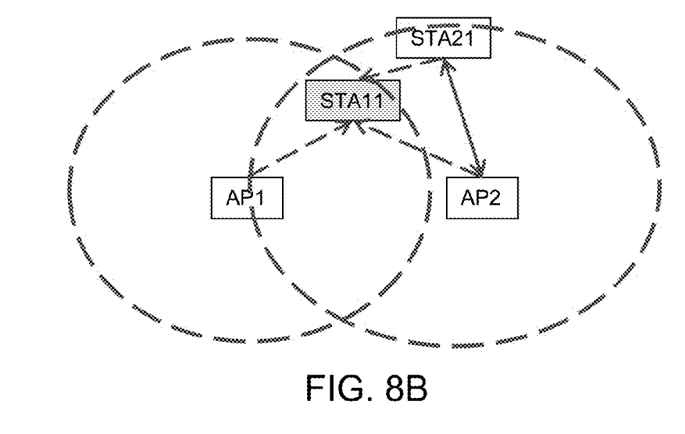

FIG. 8 shows example of HEW stations' detecting transmission in OBSS.

In FIG. 8A, it assumes the HEW AP2 and STA21 have enough SINR header room for a new transmission. In this scenario, the HEW STA11 may start a new transmission to HEW AP1.

In FIG. 8B, the HEW STA11 detects RSSI of received signal from HEW STA21 is higher than the CCAT. In this scenario, the HEW STA11 assesses the channel as busy and may not start a new transmission to HEW AP1.

Figure 9:
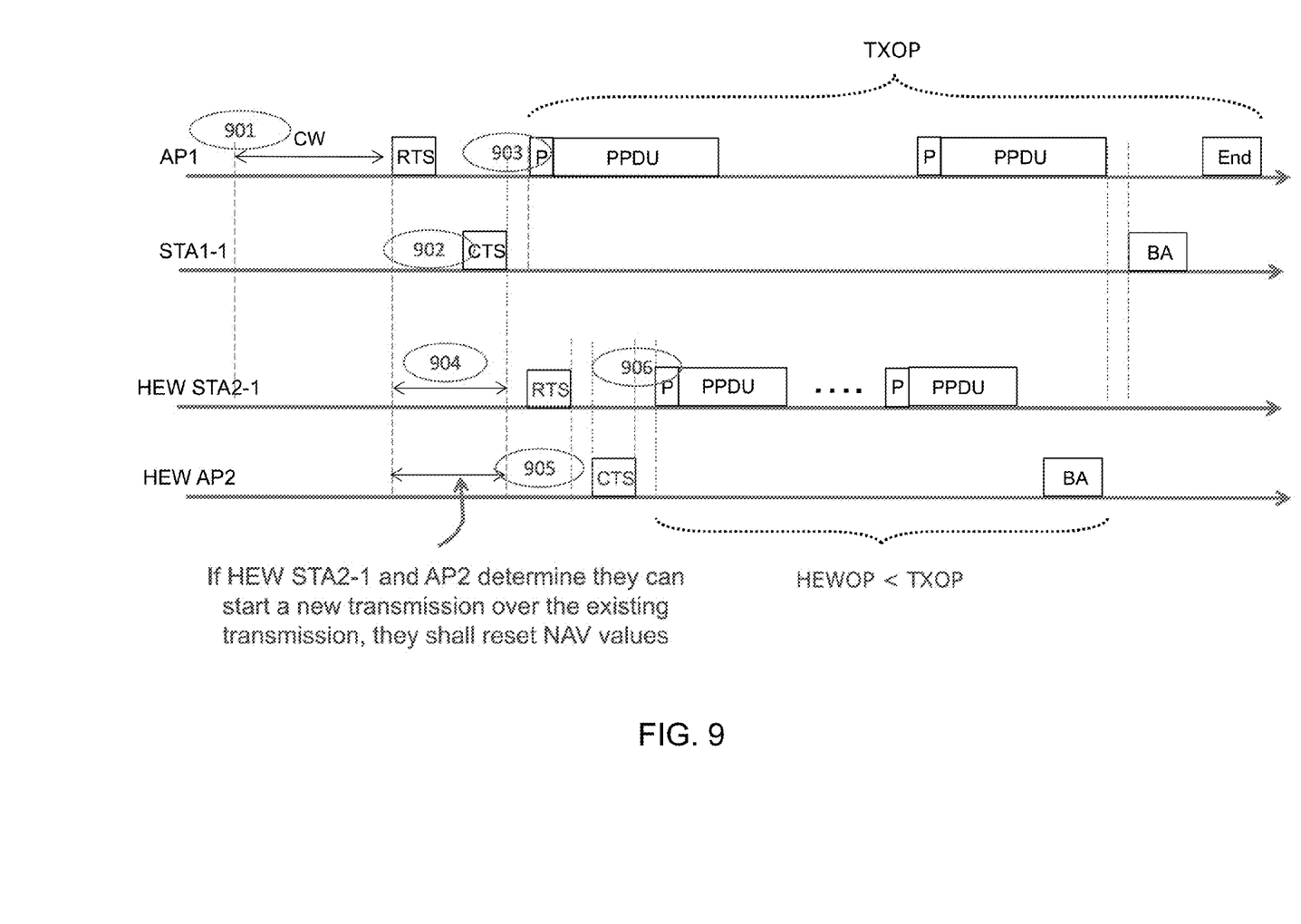
FIG. 9 shows an example of procedure for fast delivery mechanism of radio information used for improvement spectrum efficiency.

FIG. 9 shows an example of procedure of fast delivery mechanism of radio information used for improvement spectrum efficiency via establishing a new transmission over the existing transmission.

901. AP1 of BSS1 transmits a RTS (Request To Send) frame to STA1-1 of BSS1 to request a TXOP (Transmission Opportunity) after sensing the medium as idle and backoff a random time.

902. STA1-1 responds with a CTS (Clear to Send) to the AP1 after SIFS time.

903. After receiving CTS, AP1 has acquired the TXOP and starts transmission to STA1-1.

904. During the interval of RTS and CTS transmissions between AP1 and STA1-1, the STA2-1 of BSS2 could receive those frames. It measures and calculates CCAT/TP and MCS, and finds that RSSI of signals from AP1 and STA1-1 are less than CCAT. Therefore STA2-1 could start a new transmission over the existing AP1-STAT-1 communication without severely interfering them. So instead of using value in the Duration field of received RTS and CTS in the legacy NAV procedure, STA2-1 should reset its NAV, which would allow STA2-1 to be able to start a new HEW RTS and PPDU transmissions in a HEWOP. STA2-1 sends a RTS to request a transmission to AP2, and set its HEWOP duration less than current TXOP duration.

905. Similarly AP2 measures RSSI of signals from AP1 and STA1-1 and calculate CCAT. AP2 should also reset NAV when it detects RSSI of received signals is less than CCAT and a new HEW transmission is permitted. AP2 then transmits a HEW CTS to respond to the received HEW RTS, and confirm the HEWOP less than current TXOP.

906. In the HEWOP, STA2-1 and AP2 can transmit frames to each other until the end of HEW TXOP.

In some embodiments, a method of wireless communication includes performing, by a wireless communication device, interference measurement of a wireless transmission medium, and performing a current wireless transmission that includes channel assessment information. The channel assessment information includes one or more of: (a) a transmit power used for the current wireless transmission; and (b) a header room of Signal to Interference and Noise Ratio (SINR) left in the current wireless transmission according the interference measurement. Various techniques for performing interference measurements (e.g., RSSI) have been described in the present document.

In some embodiments, an apparatus for wireless communication includes a memory that stores executable instructions, and a processor that reads the executable instructions from the memory to control one or more modules of the wireless communication apparatus to perform interference measurement of a wireless transmission medium, and perform a current wireless transmission that includes channel assessment information. The information includes one or both of (a) a transmit power used for the current wireless transmission, and (b) a header room of Signal to Interference and Noise Ratio (SINR) left in the current wireless transmission according the interference measurement. Various examples are given with respect to Eq. (1) to Eq. (5).

In some embodiments, a method of wireless communication includes sensing, prior to performing a transmission, a medium for received signal strength, performing, if the sensed received signal strength is below a threshold, the transmission, receiving, if the sensed received signal strength is above the threshold, a PHY transmission, attempting to decode the PHY transmission, extracting, when the attempt to decode the PHY transmission is successful, channel assessment information from the PHY transmission, and adjusting, based on the channel assessment information, a value of the threshold for future use. FIG. 6, discussed previously, provides one example implementation.

In some embodiments, a wireless communication system includes a first wireless device that performs interference measurement of a wireless transmission medium; and performs a wireless transmission that includes channel assessment information, wherein the information includes one or both of (a) a transmit power used for the wireless transmission; and (b) a header room of Signal to Interference and Noise Ratio (SINR) left in the current wireless transmission according the interference measurement; and a second wireless device that: receives the channel assessment information; and adjusts, based on the channel assessment information, a value of a threshold for future use for clear channel assessment. The first wireless device and the second wireless device could be HEW stations (or access points), as described in the present document.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is described and illustrated, including:

1. A method of wireless communication, comprising:
   performing, by a wireless communication device, an interference measurement of a wireless transmission medium; and
   performing a current wireless transmission that includes channel assessment information, wherein the information includes one or both of:
   (a) a transmit power used for the current wireless transmission;
   (b) an operating value indicative of whether the wireless communication device is operating in a basic service set or an overlapped basic service set; and
   (c) an estimation of Signal to Interference and Noise Ratio (SINR) over an interference level based on at least the interference measurement, the operating value, and a threshold value for a clear channel assessment to indicate a channel quality that allows a new transmission to overlap at least partially with an existing transmission.

2. The method of claim 1, further including:
   determining the information at a PHY layer of the wireless communication device.

3. The method of claim 1, wherein the information is usable by a receiving node in performing the clear channel assessment.

4. The method of claim 1, wherein the information is usable by a receiving node in performing a transmit power control in the new transmission over the current transmission.

5. The method of claim 1, wherein the information is usable by a receiving node in performing a modulation and coding scheme control in the new transmission over the current transmission.

6. The method of claim 1, wherein the threshold value for the clear channel assessment changes based on a channel bandwidth.

7. A wireless communication apparatus, comprising:
   a memory that stores executable instructions; and
   a processor that reads the executable instructions from the memory and controls one or more modules of the wireless communication apparatus to:
   perform an interference measurement of a wireless transmission medium; and
   perform a current wireless transmission that includes channel assessment information, wherein the information includes one or both of:
   (a) a transmit power used for the current wireless transmission;
   (b) an operating value indicative of whether the wireless communication device is operating in a basic service set or an overlapped basic service set; and
   (c) an estimation of Signal to Interference and Noise Ratio (SINR) over an interference level based on at least the interference measurement, the operating value, and a threshold value for a clear channel assessment to indicate a channel quality that allows a new transmission to overlap at least partially with an existing transmission.

8. The apparatus of claim 7, wherein the processor further controls a module of the wireless communication apparatus to:
   determine the information at a PHY layer of the wireless communication device.

9. The apparatus of claim 7, wherein the information is usable by a receiving node in performing the clear channel assessment.

10. The apparatus of claim 7, wherein the information is usable by a receiving node in performing a transmit power control in the new transmission over the current transmission.

11. The apparatus of claim 7, wherein the information is usable by a receiving node in performing a modulation and coding scheme control in the new transmission over the current transmission.

12. The apparatus of claim 7, wherein the threshold value for the clear channel assessment changes based on a channel bandwidth.

13. A wireless communication system comprising:
   a first wireless device that:
   performs an interference measurement of a wireless transmission medium; and
   performs a wireless transmission that includes channel assessment information, wherein the information includes one or both of:
   (a) a transmit power used for the wireless transmission;
   (b) an operating value indicative of whether the wireless communication device is operating in a basic service set or an overlapped basic service set; and
   (c) an estimation of Signal to Interference and Noise Ratio (SINR) over an interference level based on at least the interference measurement, the operating value, and a threshold value for a clear channel assessment to indicate a channel quality that allows a new transmission to overlap at least partially with an existing transmission; and
   a second wireless device that:
   receives the channel assessment information; and
   adjusts, based on the channel assessment information, the threshold value for future use for the clear channel assessment.

14. The wireless communication system of claim 13, wherein the first wireless device determines the channel assessment information at PHY layer of the first wireless device.

15. The system of claim 13, wherein the threshold value for the clear channel assessment changes based on a channel bandwidth.

* * * * *